United States Patent [19]
Holder

[11] 3,964,102
[45] June 15, 1976

[54] DATA RECORDING INSTRUMENT HAVING A MOVING RECORDING HEAD

[76] Inventor: James D. Holder, 707 Graycroft Drive SW., Huntsville, Ala. 35802

[22] Filed: Dec. 23, 1974

[21] Appl. No.: 535,340

[52] U.S. Cl. .................................. 360/101; 360/88
[51] Int. Cl.² .................... G11B 5/82; G11B 25/04; G11B 21/04
[58] Field of Search ................. 360/101, 86, 117; 235/61.11 D, 61.12 M

[56] References Cited
UNITED STATES PATENTS

| | | | |
|---|---|---|---|
| 2,567,092 | 9/1951 | Williams | 360/86 |
| 3,581,064 | 5/1971 | Palmer | 360/101 |

OTHER PUBLICATIONS
IBM Technical Disclosure, Joyce, "Oscillating Transducer," Aug., 1971, p. 891.

*Primary Examiner*—Alfred H. Eddleman
*Attorney, Agent, or Firm*—Nathan Edelberg; Robert P. Gibson; Charles R. Carter

[57] ABSTRACT

An instrument for use in recording sound or data on a small disc of magnetic recording media having a pressure sensitive adhesive backing. The center point of the recording instrument is placed in the center point of the magnetic disc. After manual release a mechanism drives a recording head around the magnetic disc causing a recording to be made on the surface of the disc. The magnetic disc can then be affixed on a flat surface of an item to identify the contents thereof.

6 Claims, 6 Drawing Figures

U.S. Patent   June 15, 1976   3,964,102 under tension of the spring and lowers to a position in which the latch member 42 engages the armature at openings 44. This, causes the prongs 43 to enter the openings which prevents the armature from rotating. The center point 46 of the elongated body 14 is then engaged with the cup 48 of disc 50 and the latch member 42 is released which allows the spring 34 to rotate the armature. The runner pin 18, following groove 16, causes the armature to move in a rotary manner which in turn moves the record/play head 28 across the surface of the disc 50 in a controlled manner through the engagement of guide pin 30 in the spiral groove 31 of bulkhead 32.

DATA RECORDING INSTRUMENT HAVING A MOVING RECORDING HEAD

DEDICATORY CLAUSE

The invention described herein may be manufactured, used, and licensed by or for the Government for governmental purposes without the payment to me of any royalties thereon.

BACKGROUND OF THE INVENTION

This invention relates to the field of recording instruments. A need has arisen for a device to make recordings of information in a compact manner for attachment directly on a chart, map, box form, etc., which a user is dealing with. To make a recording on a compact magnetic media disc, a record/play stylus having a recording head moving across a fixed magnetic recording media was required.

SUMMARY OF THE INVENTION

The present invention has supplied solution to the above-stated need by providing a small disc of magnetic recording media having a pressure sensitive adhesive backing. A record/play stylus incorporating a moving recording head rather than a stationary recording head was developed.

This invention may be better understood from the following detailed description taken in conjunction with the accompanying drawing.

DESCRIPTION OF THE PREFERRED EMBODIMENT

Figure 1:
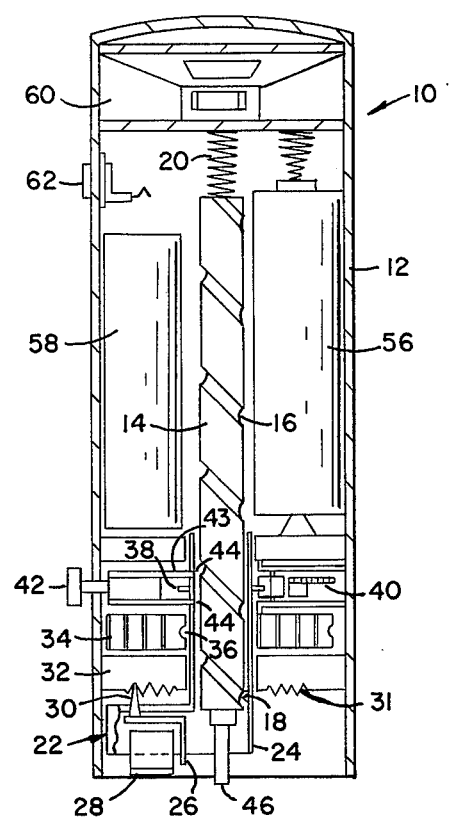
FIG. 1 of the drawing is a side view of the stylus with the center point retracted.

Referring now to the drawing, reference numeral 10 represents a record/play stylus that includes a case 12 for housing the working elements. An elongated body 14 is disposed centrally within the stylus case and is provided with helical groove 16 for engagement with a runner pin 18. The body 14 is suspended coaxially by a helix spring 20 attached to the case 12. Runner pin 18 is fixedly mounted on a rotating armature 22 which a cylindrical portion 24 that concentrically encloses body 14 in such a manner that pin 18 is in engagement with groove 16. The armature is further provided with a mounting plate 26 that supports a record/play head 28. A guide pin 30 is attached to the mounting plate and engages the spiral cut groove 31 in a bulkhead 32 immediately above the pin. As seen in FIG. 1, a drive spring 34 has one end 36 attached to the armature and the other end attached to the case. Directly above the spring 34 is a gear 38 fixedly mounted on the cylindrical portion 24 of the armature for engagement with a conventional mechanical speed regulator 40. A latch member 42 is provided with prongs 43 for engaging openings 44 in the cylindrical portion 24 to prevent rotation of the armature until the prongs are disengaged.

Figure 3:
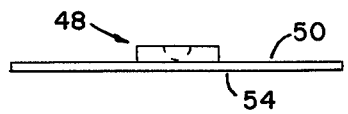
FIG. 3 is a side view of the recording disc.
Figure 4:
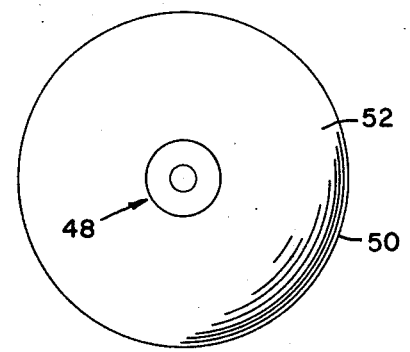
FIG. 4 is a top view of the recording disc.

Elongated body 14 has a center point 46 for engagement with a cup 48 on a magnetic recording disc 50. As seen in FIG. 4 the disc has a circular recording area 52 and is provided with a pressure sensitive backing 54, seen in FIG. 3 to affix the disc on a flat surface this disc is small in size being approximately 2 inches in diameter.

The record/play stylus includes standard components for recording or playing information on the disc. These components include a battery 56 to supply electric power to the electronics package 58 as well as a combination microphone/loud speaker 60 and an input/output jack 62.

Figure 5:
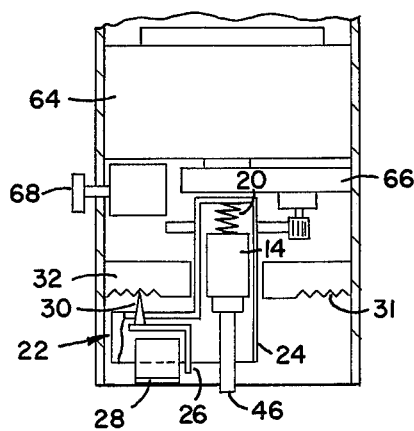
FIG. 5 is a partial side view of a modified recording instrument shown partially in section.

As shown in FIG. 5 electrical means may be used in place of the mechanical means of FIG. 1 to drive the armature. This embodiment includes a constant-speed electric motor 64, a speed reduction and armature drive means 66 and an electrical switch 68.

Figure 6:
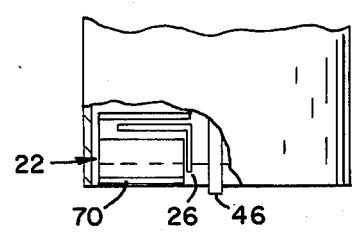
FIG. 6 is a partial view of a modified record/play head partially in section.

The record/play head 28 shown in FIGS. 1 or 5 may be replaced with a multiple-track record/play head 70 shown in FIG. 6. This head is held in a fixed position within the armature so that with track-switching means, well known in the art, recordings are made in circular concentric paths in a continuous fashion.

Figure 2:
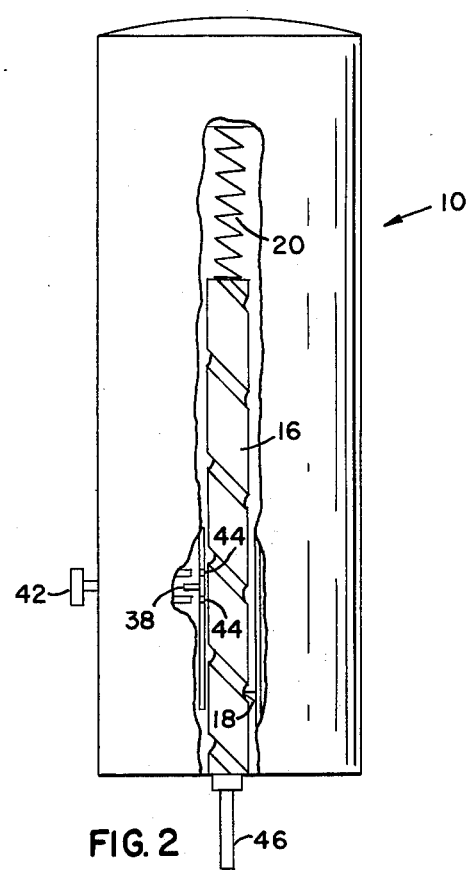
FIG. 2 is a side view of the stylus with the center point partially extended.

In operation of the instrument shown in FIGS. 1 and 2, the stylus case 10 is placed over a recording disc 50 with the center point 46 in engagement with the center point cup 48. As the case is then caused to be lowered, the latch means is released to free the armature. Runner pin 18 following the helical groove 16 causes the drive spring 34 to be wound as well as bringing the record/play head 28 to its proper starting position whereby pin 30 is at the outmost edge of groove 31. With the spring in its wound condition the latch means is caused to engage the armature until recording or playing is to be performed. When the latch means is released the armature now will be driven by the spring through the regulator 40 to cause the record/play head 28 to move across the surface of the magnetic recording disc in such a manner as to erase previous messages and record new ones or to play a previous message. As the armature rotates it carries the head 28 in a controlled stable manner determined by the engagement of guide pin 30 in the flat spiral groove cut in the bulkhead 32.

The operation of the instrument shown in FIG. 5 is the same as far as placing the center point 46 in cup 48. Switch 68 is then operated to actuated motor 64 to drive armature means 66.

I claim:
1. A data recording instrument for recording information on a magnetic disc having a center cup therein, said instrument comprising: a case; means to ready the instrument for use and position a record/play head to its starting position; said means including an elongated body disposed centrally within said case, a coaxial spring connected to said case and said body to suspend the body, a helical groove on the outer surface of said body and a center point at its other end; an armature including a cylindrical portion enclosing said body; a runner pin attached to said cylindrical portion and engaging said helical groove, said armature further including a mounting plate and a record/play head attached to said plate; a bulkhead having a spiral cut groove thereon and disposed above said mounting plate; a guide pin attached to said mounting plate and engaging said spiral cut groove; a drive spring disposed around said armature cylindrical portion, said spring having one end attached to said cylindrical portion and its other end attached to said case, and a regulator means connected to said drive spring to control rotation of the armature and move the record/play head in a manner to erase previous messages and record new ones or to play a previous message.

2. A data recording instrument as set forth in claim 1 includes a latching member to engage said armature and prevent rotation thereof until the latch is disengaged.

3. A data recording instrument as set forth in claim 2 wherein said latching member is provided with prongs for engaging openings in said armature.

4. A data recording instrument as set forth in claim 3 wherein said record/play head is a multiple-track record/play head held in fixed position within said armature.

5. A data recording instrument for recording information on a magnetic disc having a center cup therein, said instrument comprising: a case; means to ready the instrument for use and position a record/play head to its starting position, said means including an elongated body disposed centrally within said case, a coaxial spring connected to said case and said body to suspend the body; an armature including a cylindrical portion enclosing said body, said armature further including a mounting plate and a record/play head attached to said plate; a bulkhead having a sprial cut groove thereon and disposed above said mounting plate; a guide pin attached to said mounting plate and engaging said spiral cut groove; a drive means disposed to actuate said armature; a constant speed electric motor for actuating said drive means; an electrical switch for controlling movement of said electric motor and armature to move the record/play head in a manner to erase previous messages and record new ones or to play a previous message.

6. A data recording instrument as set forth in claim 5 wherein said record/play head is a multiple-track record/play head held in fixed position within said armature.

* * * * *